D. B. NEAL
Corn-Planter.
No. 13,706.  Patented Oct. 23. 1855.
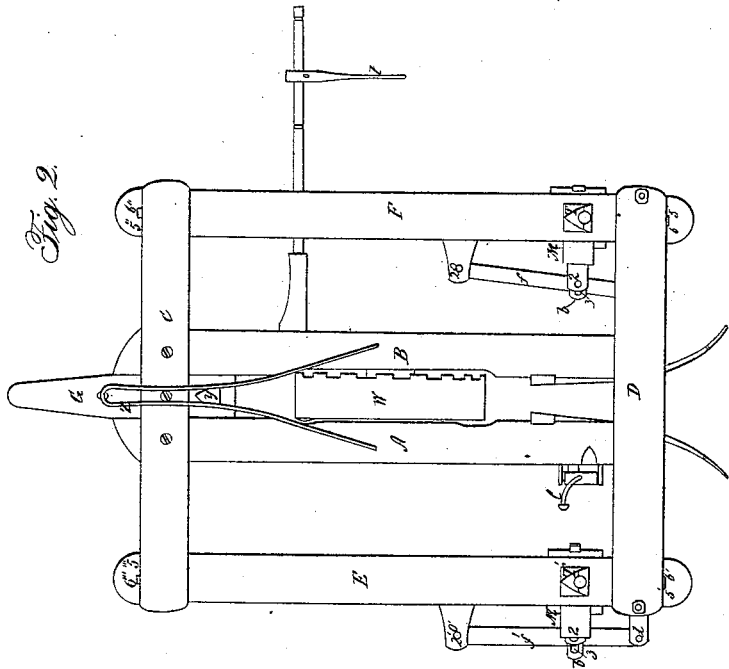
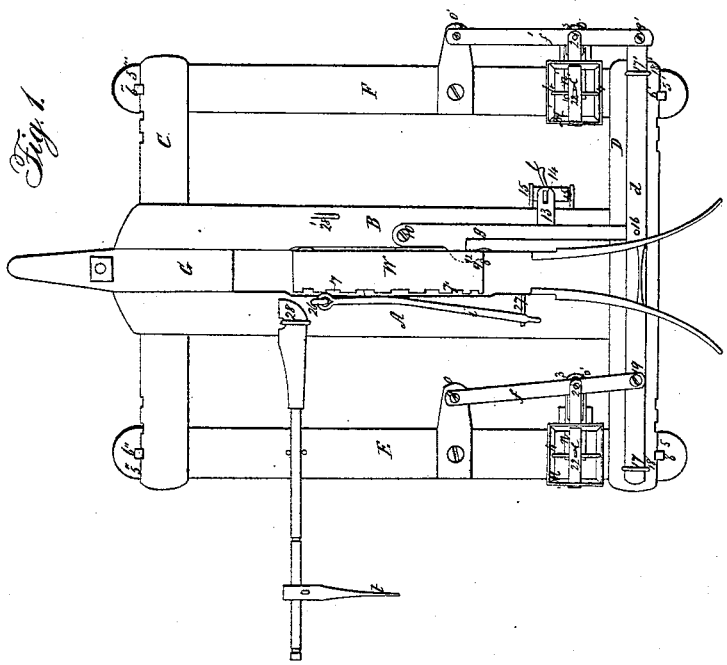
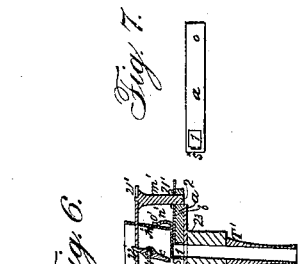
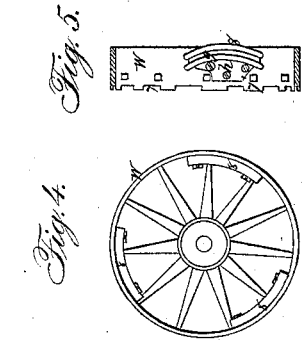
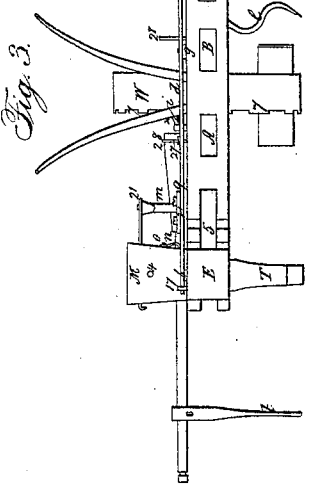

UNITED STATES PATENT OFFICE.

DANIEL B. NEAL, OF MOUNT GILEAD, OHIO.

IMPROVEMENT IN SEED-PLANTERS.

Specification forming part of Letters Patent No. 13,706, dated October 23, 1855.

*To all whom it may concern:*

Be it known that I, DANIEL B. NEAL, of Mount Gilead, in the county of Morrow and State of Ohio, have invented a new and useful Improvement in Seed-Planters; and I do hereby declare that the following is a full and exact description thereof, reference being had to the accompayning drawings, and to the letters of reference marked thereon.

To enable others skilled in constructing agricultural implements to make and use my invention, I will proceed to describe its construction and operation.

I take four scantling, about four inches square and from six to eight feet in length, (the length of the planter,) two of which I use for center beams, A and B, and attach them permanently to two other scantling of the same size, about four feet in length—the end pieces, C and D. These center beams should be a proper distance apart for the driving-wheel to run between. The other two scantling I use for side pieces, E and F, which are placed in the slots 5 5′ 5″ 5‴ in the end pieces, so as to be moved at pleasure, and thus expand and contract the width of the planter as may be desired. These side pieces are secured to the end pieces by keys at 6 6′ 6″ 6‴. Between the center beams at the front end I put a draft-beam, G, on the under side of which I attach by staple a guard, Z, of the shape of a capital letter A, the lower legs passing back on each side of the wheel W, so as to move all clods or stones from the path of the wheel, and thus prevent it sliding. This guard should be made of iron of suitable width and thickness, and be held to its place by a short post, Y, attached to the draft-beam and fitting closely between the legs of the guard. The driving-wheel W, I make eight feet in circumference, of a suitable width to run between the center beams and equidistant from their ends, the axle working in these beams. The left side of the periphery of said wheel is notched or cogged, 7 7′, so that it may be held or turned with the lever $i$ on the inside of the periphery, as at 8. I attach the cams 8, from one to eight in number, as may be desired, which are attached to the wheel by screws, so as to be removed at pleasure, and thus regulate the distance of the hills apart. Each cam has a circular slot, 9, so that each cam will move the slide for dropping the seed out, drop the seed, and move it back again to receive another hill.

To the right center beam, B, I attach by screw, at 10, the rod $g$, so that the point 12 will pass through the slot in the cam and swing the rod $g$ back and forth as the wheel revolves. To an arm, 13, of this rod, at 14, I attach the marker $l$, which swings on a pivot at 15, and is shaped and moved so as to throw up a quantity of dirt in direct line between the hills as the seed reaches the proper place for covering through the teeth T T′.

To the rod $g$, I attach a sliding rod, $d$, at 16, by a bolt, so as to play freely. This sliding rod $d$ lies immediately over the back end piece, D, and slides endwise through staples 17 17′, attached to each end of the end pieces at 18 18′. To this sliding rod, on the right side of the side pieces, E F, or seed-box, I attach the shifting-rods $ff'$, at 19 19′, by bolt. These shifting-rods are also attached to the side pieces at 20 20′, so as to swing easily. To these shifting-rods are attached, at 21 21′, the slides $a\,a'$ for dropping the seed, and also the shovels $c\,c'$ by means of the small upright posts $m\,m'$. A small slide is attached to these posts at 21 21′, which passes through each seed-box. The shovels $c\,c'$ work in the small slots 22 22′ in these slides. The slides $a\,a'$, for dropping the seed, are attached to the lower end of the small posts $m\,m'$ at 21 21′, and play on the bottom of the seed-boxes, immediately under a steel or iron spring, $n\,n'$, fastened to the outside of the seed-boxes at $o\,o'$, which are curved and of such a length as to completely cover the slot in the slide when said slide is drawn out for dropping the seed. The shovels $c\,c'$ swing on pivots which pass through the boxes into the slides. Said shovels should be of such a length as to play closely to the slot in the slide $a$, but not touch it. The slides $a\,a'$, for dropping the seed, should be made of metal about three-eighths of an inch in thickness, slotted at the ends, at 1, which lies in the boxes to receive the seed. That portion of said slide between the slot and the end $s$ should be cut down about the thickness of a grain of corn, so as to prevent the grain from being broken by the spring. There is also three grooves of different sizes, from a tobacco-seed to a cotton-seed, cut at the end of the slot in this piece at $x$ for dropping small seed. The gages $b\,b'$ are not as wide as the slides $a\,a'$, and should be sunk their whole thickness into said slides and bent at the end at a right angle at 23, and run to the bottom of the slot 1. This gage is attached to the slide, so as to be moved at pleasure, by means of a slot at 3 and a shoulder on the upright post, which post should be screwed into the slide.

On the back end of each side piece I place a seed-box, M M', made of wood, of a proper size. Immediately under the boxes are the hollow cast-iron teeth T T', through which the seed is dropped. These teeth are set into the side pieces, and the hollow connects with a hole in the bottom of each box, and should not be over two inches wide, so that the dirt will close over the seed.

The handles for holding the planter are similar to common plow-handles, and are fastened to the inside of the center beam back of the wheel.

The lever $i$, for holding or turning the wheel, I attach by a staple to the left center beam, forward of the axle, at 26, and lies on a rest, 27, fixed near the handle on said beam.

To use the planter for drilling, first determine the distance apart you desire the seed dropped and put on the necessary number of cams. This done, next determine the quantity of seed desired and gage the slots in the slides by unscrewing the posts $m\ m'$ and moving the gages $b\ b'$. Then fasten the gages by screwing the posts down again. If the seed is small, like tobacco-seed, close the slat with the gage and fill one or more of the grooves $x$ with cork or something of that kind. Then fill the boxes with seed and put the machine in motion.

To plant in rows both ways, first mark off the ground one way with the planter by taking off all the cams, fixing the side pieces a proper distance apart for the rows, then strike two furrows on one side of the field, then attach the gage-marker to the planter on each side at 28 28', so that the point $t$ will drag in the last furrow, when the tooth on its side of the planter is a proper distance from said furrow. A proper attention to this will enable any one to make the furrows equidistant apart. This done, arrange the cams so as to drop a hill in each of the furrows as the planter crosses it, arrange the gage for dropping the proper quantity of seed, fill the boxes with seed, and commence dropping or planting across the furrows, using proper care to get the first hills in each row in range. This may be easily done by managing the wheel with the lever $i$. The first hills in their places, there will be but little difficulty with the others. Attention should, however, be given to the stroke of the marker $l$ to see that it strikes in each furrow, as that marks the line in which the hills are dropped. Should a variation be noticed, regulate it with the lever, as before stated. Should it be desired to drag the planter while the cams are on, throw the lever into a cog of the wheel, where it may be held by means of a strap or chain attached to the beam below.

I claim—

The arrangement of the shovels $c$, the slotted and grooved slide $a$, and gage-slide $b$, when constructed and operated in the manner and for the purpose set forth.

DANIEL B. NEAL.

Attest:
T. H. DALRYMPLE,
B. B. MITCHELL,
C. G. PRENTISS.